US007342600B2

(12) United States Patent
Nakano

(10) Patent No.: US 7,342,600 B2
(45) Date of Patent: Mar. 11, 2008

(54) IMAGE FORMING DEVICE

(75) Inventor: Takashi Nakano, Rittoh (JP)

(73) Assignee: Murata Machinery Ltd., Kyoto (JP)

( * ) Notice: Subject to any disclaimer, the term of this patent is extended or adjusted under 35 U.S.C. 154(b) by 366 days.

(21) Appl. No.: 11/251,185

(22) Filed: Oct. 13, 2005

(65) Prior Publication Data

US 2006/0092256 A1 May 4, 2006

(30) Foreign Application Priority Data

Nov. 1, 2004 (JP) ............................ 2004-318432
Nov. 1, 2004 (JP) ............................ 2004-318433

(51) Int. Cl.
*B41J 2/435* (2006.01)
*G02B 26/10* (2006.01)
*G02B 26/12* (2006.01)

(52) U.S. Cl. ....................................... 347/257; 347/242

(58) Field of Classification Search ................ 347/242, 347/245, 256, 257

See application file for complete search history.

(56) References Cited

U.S. PATENT DOCUMENTS

| | | | | |
|---|---|---|---|---|
| 5,633,744 | A * | 5/1997 | Nakajima | 359/196 |
| 6,888,654 | B2 * | 5/2005 | Cannon et al. | 359/204 |
| 6,982,736 | B2 * | 1/2006 | Okugawa et al. | 347/152 |
| 7,136,088 | B2 * | 11/2006 | Yoshida et al. | 347/242 |
| 2004/0047389 | A1 * | 3/2004 | Cannon et al. | 372/101 |

FOREIGN PATENT DOCUMENTS

| | | |
|---|---|---|
| JP | 01-211744 | 8/1989 |
| JP | 05-048786 | 2/1993 |
| JP | 2003-094723 | 4/2003 |

* cited by examiner

*Primary Examiner*—Huan Tran
(74) *Attorney, Agent, or Firm*—Keating & Bennett, LLP

(57) ABSTRACT

An image forming device includes an image carrier, a charging unit, an exposing device, a developing device, a control device and a pair of position adjusting devices. Each of the position adjusting devices is respectively provided at a leading edge and a trailing edge of an output field of the laser light of the exposing device. The position adjusting devices move the exposing device in a direction intersecting with a plane including a rotational center line of the image carrier to adjust a scanning direction of the laser light to be parallel to the rotational center line of the image carrier.

20 Claims, 18 Drawing Sheets

IMAGE FORMING DEVICE

BACKGROUND OF THE INVENTION

1. Field of the Invention

The present invention relates to an image forming device such as a copying machine, a printer, and a facsimile machine.

2. Description of the Related Art

A known electrophotographic image forming device uses, for example, a photoconductive drum as an image carrier. In such an image forming device, a surface of a charged photoconductive drum is exposed by a laser light, and an electrostatic latent image is formed. Toner adheres to the electrostatic latent image, and the electrostatic latent image is visualized. The visualized image is transferred onto paper, and an image is formed. There exists a demand for an improvement of an image quality in such an image forming device. Accompanying this demand, an improvement in the accuracy of an exposed position of the laser light with respect to the photoconductive drum has been important. However, if errors accumulate in component accuracy or in assembly of the photoconductive drum or an exposing device, which outputs the laser light, accuracy of the exposed position of the laser light with respect to the photoconductive drum decreases. As a result, defects, such as an inclination of an image with respect to a recording paper, are generated. Therefore, after mounting the exposing device, a mounted position of the exposing device is adjusted to improve the accuracy of the exposed position of the laser light with respect to the photoconductive drum.

According to a conventional method for adjusting a mounted position of an exposing device, for example, a fine adjustment is carried out by adding a shim for a position adjustment to the mounted position. When adjusting the mounted position by using the shim, after adding the shim and fixing the exposing device with a screw, it is necessary to check whether or not the accuracy of the position has improved. Therefore, when the accuracy of the position has not improved as expected, it is necessary to remove the fixed screw and replace with a shim having a different thickness and fix the screw again. Each time the shim is replaced, a troublesome operation must be performed because the screw must be removed and then fixed again.

As conventional methods other than the method using the shim for adjusting the position, for example, there are the following two methods. According to a first conventional method, a printer unit includes a Laser Scanning Unit (LSU) and a photoconductive drum, in this order from an upper portion of a frame, and two bar-shaped members are arranged parallel to a driving shaft core of the photoconductive drum and are spaced away from one another by an appropriate distance in a horizontal direction in an upper portion of the printer unit within the frame. The LSU, which is positioned by the bar-shaped members in the same manner, is also positioned highly accurately with respect to the photoconductive drum.

According to a second conventional method, an optical writing unit includes a laser light source and irradiates a light from the laser light source onto a surface of a photoconductive drum via a reflecting mirror. A unit frame including the laser light source and the reflecting mirror are held inside an image forming device such that the unit frame can be pivoted within a plane parallel to an axial line direction of the photoconductive drum. In addition, the rotation of the unit frame is controlled by a cam, which rotates by being driven by a motor, and an elastic member, which urges the unit frame against a cam surface.

According to the first conventional method, the LSU is positioned highly accurately with respect to the photoconductive drum. However, there are cases where after assembling the LSU, the position of the LSU is displaced due to a lack of component accuracy or an accumulated error of the frame itself on which the LSU is mounted or other parts, or the position of the LSU is displaced as a result of a change over time of the frame or the like, or due to vibration. In these cases, since the first conventional method does not provide a mechanism for adjusting the position after the assembling, an exposing position of the LSU cannot be adjusted easily when the accuracy of the exposing position of the LSU has decreased. According to the second conventional method, since the position of the optical unit is adjusted by using the cam, the entire unit is configured to rotate. As a result, it is difficult to make a fine adjustment, and after making an adjustment, the entire unit is prone to move, making the accuracy unstable.

SUMMARY OF THE INVENTION

In order to overcome the problems described above, preferred embodiments of the present invention provide an image forming device wherein a mounted position of the exposing unit can be adjusted easily and accuracy of an exposed position of the laser light can be stabilized even after an exposing unit, which scans a laser light and forms an electrostatic latent image, is mounted.

According to a preferred embodiment of the present invention, an image forming device includes an image carrier, a charging unit, an exposing unit, a developing unit, a control unit, and a pair of position adjusters. The charging unit charges a surface of the image carrier. The exposing unit scans a laser light on the charged surface of the image carrier and forms an electrostatic latent image. The developing unit adheres toner onto the electrostatic latent image formed on the surface of the image carrier to visualize the electrostatic latent image. The control unit controls a rotation of the image carrier and controls each of the above-mentioned units for forming an image onto paper. In the image forming device, each of the position adjusters is respectively provided at a leading edge and a trailing edge of an output field of the laser light output by the exposing unit. The position adjusters move the exposing unit in a direction intersecting with a plane including a rotational center line of the image carrier. Accordingly, the position adjusters adjust a scanning direction of the laser light to be parallel or substantially parallel to the rotational center line of the image carrier.

According to the above-described preferred embodiment, each of the position adjusters is provided respectively at the leading edge and the trailing edge of the output field of the laser light of the exposing unit. Therefore, an adjustment of the movement of the exposing unit in the direction intersecting with the plane including the rotational center line of the image carrier can be carried out easily and accurately. That is, when the output field of the laser light output from the exposing unit is inclined with respect to the plane including the rotational center line of the image carrier, by adjusting the position adjuster at the leading edge and the position adjuster at the trailing edge in opposite directions from one another, the inclination can be adjusted easily within a short period of time. As a result, an adjustment operation can be carried out efficiently. Moreover, since the adjustment operation is carried out while moving both of the position adjusters simultaneously, the position can be adjusted accurately.

According to a preferred embodiment of the present invention, each of the position adjusters preferably includes a cam member and a position adjusting member. The cam member is mounted rotatably on a main body frame. The position adjusting member is mounted on the exposing unit and includes a hole where the cam member is loosely inserted. Accompanying the rotation of the cam member, both the position adjusting member and the exposing unit move.

According to the above-described preferred embodiment, each of the position adjusters includes the cam member, which is mounted rotatably on the main body frame, and the position adjusting member, which is mounted on the exposing unit and includes a hole where the cam member is loosely inserted. Therefore, a position adjustment can be carried out continuously by rotating the cam member. As a result, a highly accurate position adjustment can be carried out easily and reliably.

According to another preferred embodiment of the present invention, an image forming device includes an image carrier, a charging unit, an exposing unit, a developing unit, a control unit, a supporting body, and a pair of position adjusters. The charging unit charges a surface of the image carrier. The exposing unit scans a laser light on the charged surface of the image carrier and forms an electrostatic latent image. The developing unit adheres toner to the electrostatic latent image formed on the surface of the image carrier and visualizes the electrostatic latent image. The control unit controls a rotation of the image carrier, and controls each of the above-mentioned units for forming an image onto paper. The exposing unit is placed and fixed on the supporting body. Each of the position adjusters is respectively provided on a main body frame at a leading edge and a trailing edge of an output field of the laser light of the exposing unit. Each of the position adjusters includes an urging member and a cam member. A portion of the supporting body is urged against a cam surface of the cam member by the urging member of the position adjuster. Accompanying a rotation of the cam member, the exposing unit moves in a direction intersecting with a plane including the rotational center line of the image carrier. Accordingly, a position adjustment of the supporting body is carried out so that a scanning direction of the laser light becomes parallel or substantially parallel to the rotational center line of the image carrier. Further, the position adjustment of the supporting body is preferably carried out by the position adjusters in a state in which the supporting body is held on the main body frame such that the supporting body can be pivoted.

According to the above-described preferred embodiment, each of the position adjusters is respectively provided at the leading edge and the trailing edge of the output field of the laser light of the exposing unit. Therefore, the adjustment of the movement of the exposing unit in the direction intersecting with the plane including the rotational center line of the image carrier can be carried out easily and accurately. That is, when the output field of the laser light output from the exposing unit is inclined with respect to the plane including the rotational center line of the image carrier, the inclination can be adjusted easily within a short period of time by adjusting the position adjuster at the leading edge and the position adjuster at the trailing edge in opposite directions from one another. As a result, an adjusting operation can be carried out efficiently. In addition, since the adjustment operation is carried out while operating both of the position adjusters simultaneously, the position can be adjusted accurately.

Each of the position adjusters preferably includes an urging member and a cam member, which are provided on the main body frame supporting the supporting body. A portion of the supporting body is urged against a cam surface of the cam member by the urging member. Therefore, a fine adjustment can be carried out by a movement of the cam member. Since the supporting body is sandwiched between the cam surface and the urging member, the supporting body is held in a stable state. In particular, when one of the position adjusters is moved, the supporting body is prevented from moving unexpectedly by the other position adjuster, and the adjustment operation can be carried out in a stable state.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described below. Further, the preferred embodiments to be described below are only preferred specific examples for implementing the present invention. Therefore, there are various technical limitations in the following description. However, unless explicitly stated in the following description, the present invention shall not be limited to the preferred embodiments described herein.

Figure 1:
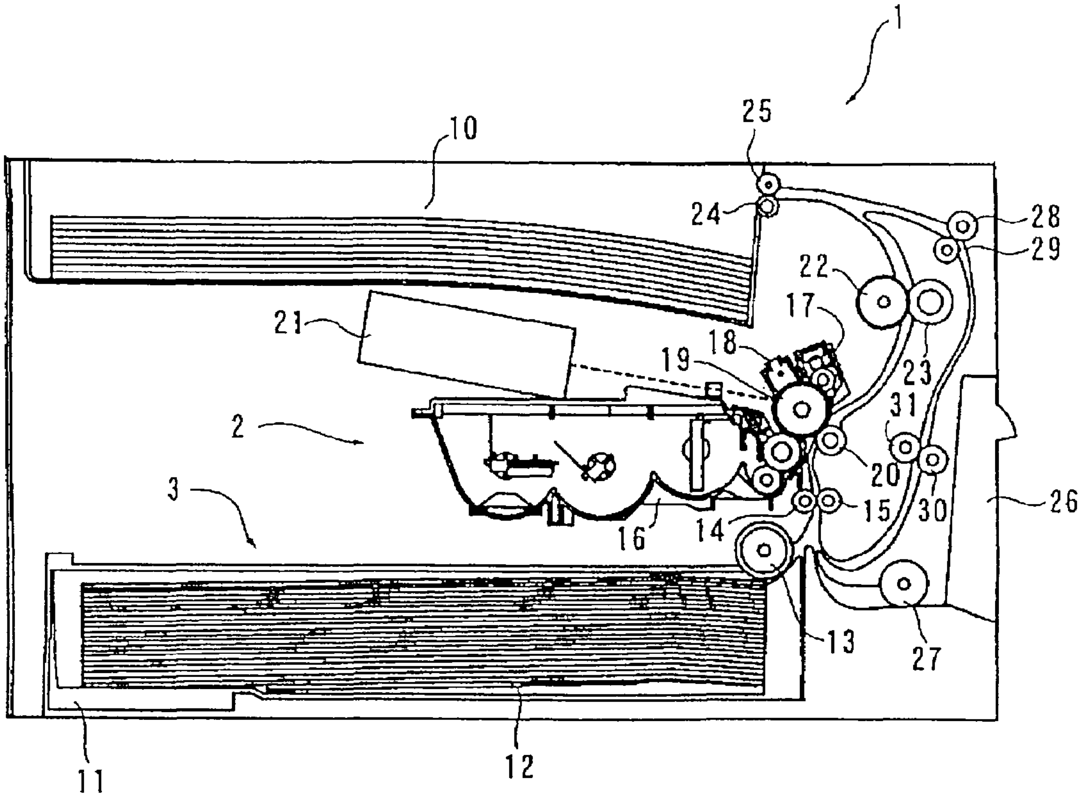
FIG. 1 schematically illustrates the entire image forming device according to a preferred embodiment of the present invention.

FIG. 1 is a schematic cross-sectional view of the entire image forming device according to a preferred embodiment of the present invention. A paper discharge tray 10 is arranged in an upper portion of an image forming device 1. A printer unit 2 and a paper feed unit 3 are arranged in a lower portion of the image forming device 1.

A paper feed cassette 11 is provided in the paper feed unit 3. A plurality of sheets of paper of a prescribed size is stacked on a flapper 12. A pickup roller 13 is disposed at a right end portion of the paper feed cassette 11. The flapper 12 is urged upward by a spring member (not shown). Accordingly, an upper surface of the stacked papers makes contact with the pickup roller 13. When the pickup roller 13 is driven and rotates in this state, the paper is transported one sheet at a time into a paper transportation path by a frictional force.

The fed paper is transported to the printer unit 2 by a feed roller 14 and a press roller 15. The printer unit 2 includes a developing unit 16, a cleaning mechanism 17, a corona charger 18, a photoconductive drum 19, a transfer roller 20, an exposing head 21, and a fixing roller 22 for printing onto the transported paper. The cleaning mechanism 17 includes a cleaning roller. The cleaning roller traps a foreign substance, such as remaining toner and paper dust, adhered on a surface of the photoconductive drum 19 after a transfer process and cleans the surface of the photoconductive drum 19. The corona charger 18 includes a discharge wire. The surface of the photoconductive drum 19 is charged uniformly by corona discharge from the discharge wire. The exposing head 21 exposes the uniformly charged photoconductive drum 19 according to an image printing signal and an electrostatic latent image is formed. Toner in the developing unit 16 transfers onto the electrostatic latent image formed on the photoconductive drum 19. Accordingly, the electrostatic latent image is visualized as a toner image. The transfer roller 20 is disposed at a position facing the photoconductive drum 19 across the paper. When a prescribed voltage is applied to the transfer roller 20, the toner image formed on the surface of the photoconductive drum 19 is transferred onto the paper. The transferred toner image is fixed onto the paper by being sandwiched, heated, and pressed by the fixing roller 22 and a press roller 23. The paper on which the toner image is fixed is sandwiched between a paper discharge roller 24 and a press roller 25 and transported out onto the paper discharge tray 10.

A manual paper feeding mechanism and a reversal transportation mechanism are provided at a side of a device main body. A manual paper feeding operation is carried out by opening a side cover 26 and inserting paper to a paper feed roller 27. A printing operation is carried out onto the inserted paper while the inserted paper is being transported by the paper feed roller 27 to the feed roller 14 and the press roller 15. When carrying out a reversal transportation, the paper on which an image is printed on one side is sandwiched between the paper discharge roller 24 and the press roller 25 and partially transported out. Then, the paper discharge roller 24 rotates in a reverse direction, and the paper is transported into a reversal transportation path. Two pairs of transportation rollers, i.e. a feed roller 28 and a press roller 29, and a feed roller 30 and a press roller 31, transport the paper downward. The feed roller 14 and the press roller 15 transport the paper again and a printing operation is carried out onto another side of the paper. Accordingly, an image is printed onto both sides of the paper.

Figure 2:
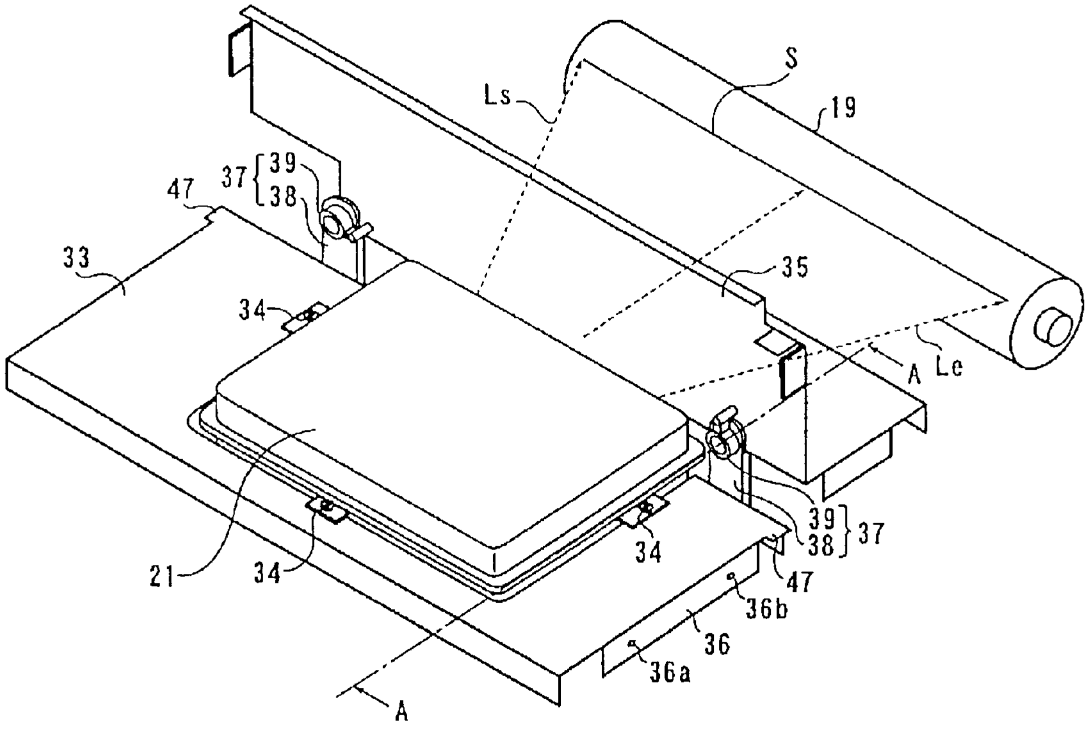
FIG. 2 is a perspective view relating to a portion where an exposing head is mounted.

Next, referring to FIG. 2 through FIG. 9, a description will be made of one of the unique features of the image forming device according to a first preferred embodiment of the present invention. FIG. 2 is a perspective view illustrating where the exposing head 21 is mounted. Optical components, such as a laser light source, a polygon mirror and a plurality of lenses, are unitized and provided in the exposing head 21. The exposing head 21 is fixed at mounting holes of a mounting bracket 33 that is preferably formed from a metal plate. A plurality, e.g., three, fixing portions 34 are arranged to protrude horizontally from side surfaces of the exposing head 21. The fixing portions 34 are fixed by a screw, a pin, or other suitable fixing element at a periphery of the mounting holes of the mounting bracket 33.

A fixing portion 36 and a locking portion 47 are arranged on both sides of the mounting bracket 33, respectively. The fixing portion 36 is bent substantially perpendicularly from both sides of the mounting bracket 33. The locking portion 47 protrudes horizontally from both sides of the mounting bracket 33. Two screw holes **36*a* and 36*b* are arranged on each of the fixing portions 36 at a prescribed interval between one another in a horizontal direction. One of the screw holes 36*a* is arranged at a position that is spaced away from the photoconductive drum 19. The other screw hole 36*b* is arranged at a position located closer to the photoconductive drum 19. The mounting bracket 33 is mounted onto side frames (not shown) by a holding screw screwed into the screw hole 36*a*, to be described later, such that the mounting bracket 33 can be pivoted. The mounting bracket 33 is fixed onto the side frames by a fixing screw screwed into the screw hole 36*b***.

Since the locking portions 47 preferably have a substantially flat rectangular shape, for example, the locking portions 47 can be fit into locking holes (not shown) arranged on the side frames of a main body frame. The locking holes arranged on the side frames are preferably larger than the locking portions 47 to enable a vertical movement of the locking portions 47.

A procedure for mounting the mounting bracket 33 onto the side frames includes, first, fitting the locking portions 47 into the locking holes of the side frames and screwing the holding screws into the screw holes **36*a*. Accordingly, the mounting bracket 33 is held temporarily on the side frames. In this state, the mounting bracket 33 can be pivoted around the screw holes 36*a*. Therefore, an inclined position of the exposing head 21 can be adjusted easily by position adjusters 37, described later. After the adjustment of the inclined position of the exposing head 21 by the position adjusters 37 has been completed, the mounting bracket 33 is fixed completely on the side frames by screwing the fixing screws into the screw holes 36*b***.

A base frame 35, which is a part of the main body frame, is disposed above a side of the exposing head 21 located closer to the photoconductive drum 19. The base frame 35 is preferably formed from a metal plate in the shape of a cross-section of the letter-L. The base frame 35 is fixed on the side frames (not shown). A vertical portion of the base frame 35 is disposed substantially parallel to a side surface of the mounting bracket 33 located closest to the photoconductive drum 19. A horizontal portion of the base frame 35 protrudes above an output field of the laser light from the exposing head 21 and towards the photoconductive drum 19.

Figure 3:
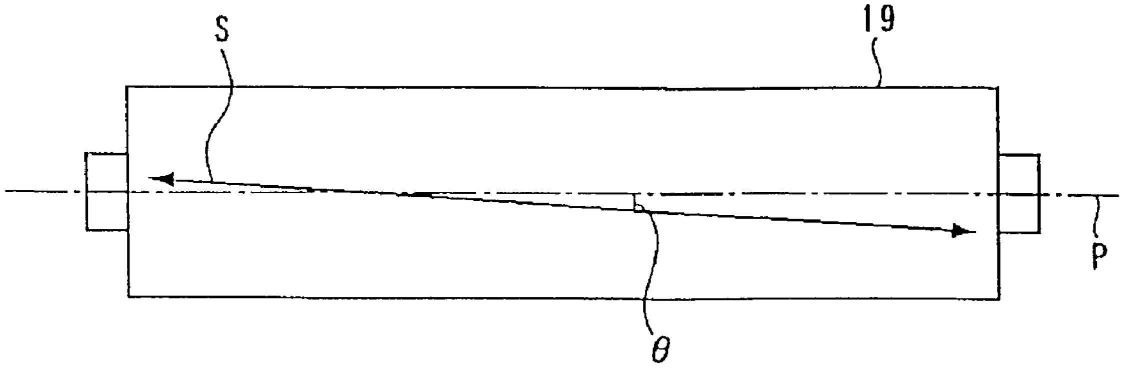
FIG. 3 illustrates a relationship between an axial line of a rotational shaft of a photoconductive drum and a scanning line.

A light path of the laser light output from the exposing head 21 sequentially moves within the output field from a leading edge Ls to a trailing edge Le. Accordingly, the laser light is irradiated along a scanning line S on the surface of the photoconductive drum 19. FIG. 3 is a view illustrating a relationship between a rotational center line P of a rotational shaft of the photoconductive drum 19 and the scanning line S. To form an electrostatic latent image accurately on the surface of the photoconductive drum 19, the rotational center line P and the scanning line S are required to be parallel or to coincide with one another. As illustrated in FIG. 3, when the scanning line S is inclined by an angle θ with respect to the rotational center line P, an electrostatic latent image is also inclined on the surface of the photoconductive drum 19. To adjust such an inclination, each of the position adjusters 37 is provided respectively at the leading edge Ls and the trailing edge Le.

Each of the position adjusters 37 preferably includes a position adjusting plate 38 and a cam member 39. A lower portion of the position adjusting plate 38 is fixed on the mounting bracket 33. The cam member 39 is loosely inserted in a hole arranged through an upper portion of the position adjusting plate 38. The cam member 39 is mounted rotatably on the base frame 35.

Figure 4:
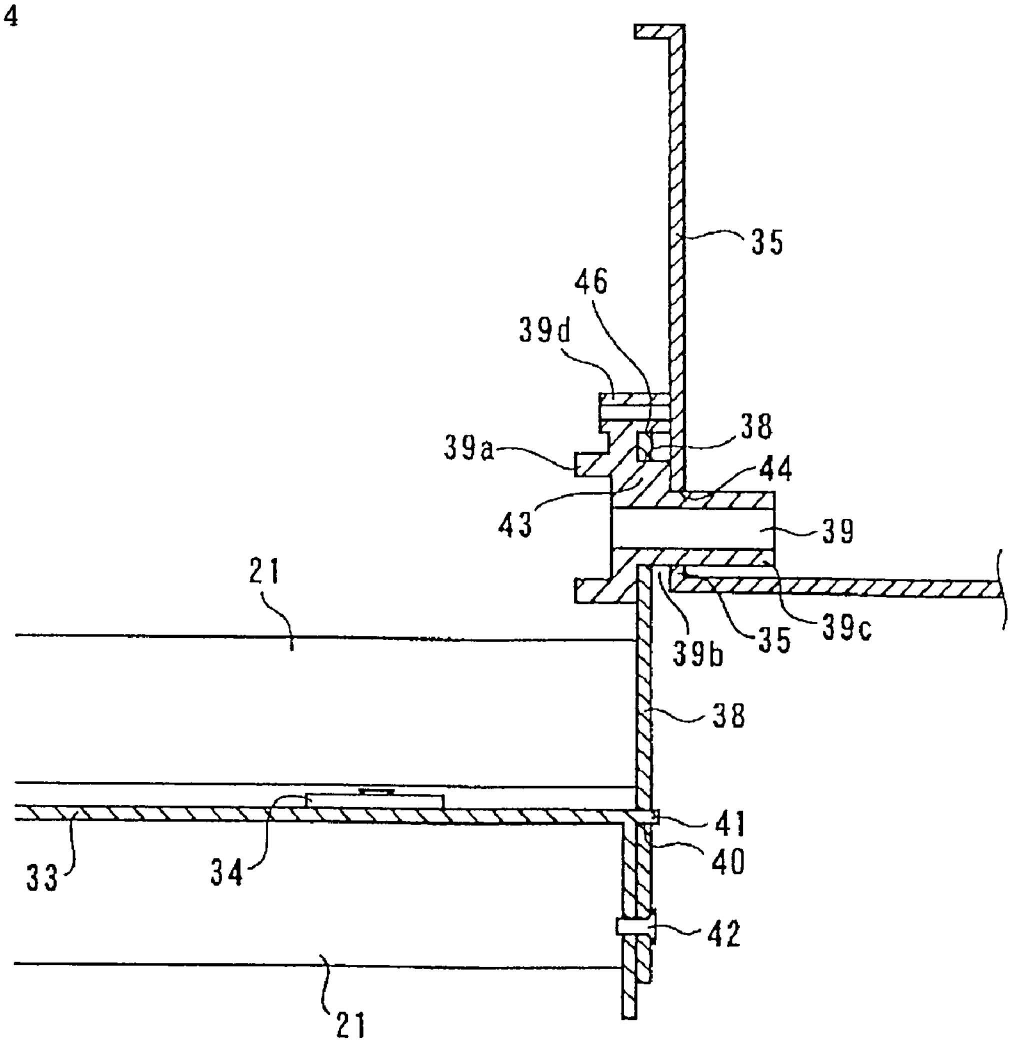
FIG. 4 is an enlarged cross-sectional view of a position adjuster taken along lines A-A in FIG. 2.
Figure 5:
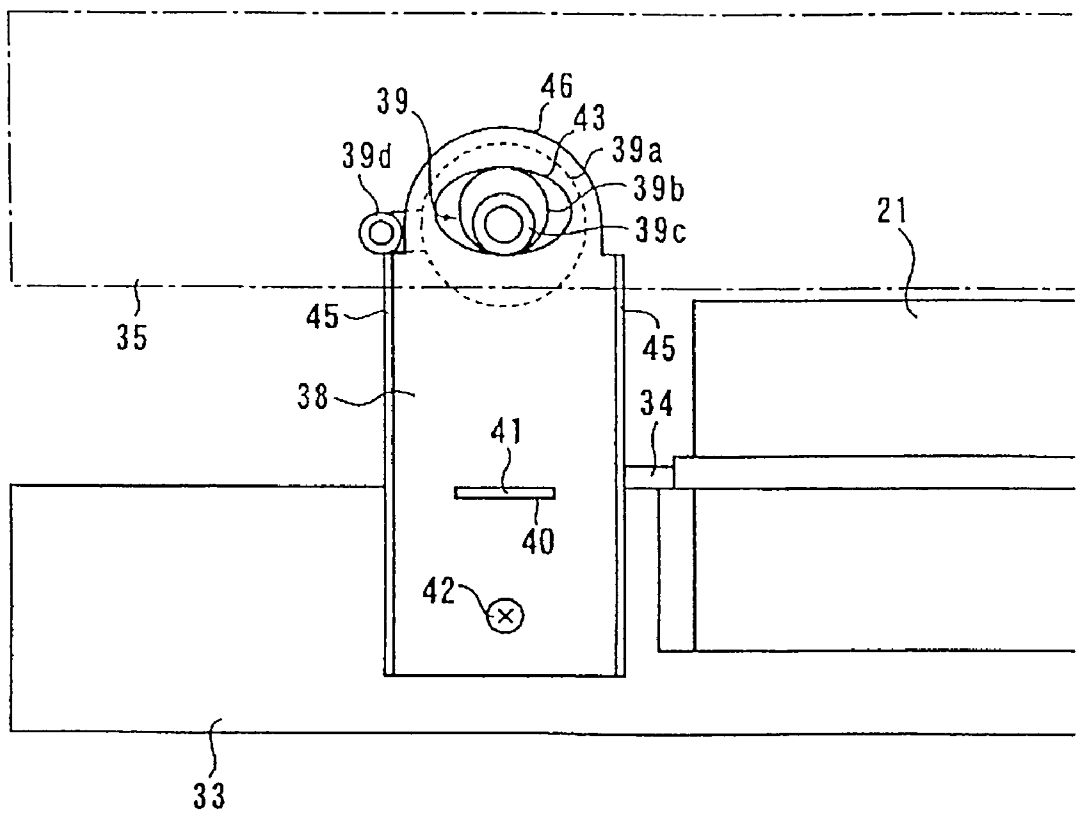
FIG. 5 is an enlarged view of the position adjuster viewed from a side of the photoconductive drum.

FIG. 4 is an enlarged cross-sectional view of the position adjuster 37 at the trailing edge Le taken along lines A-A of FIG. 2, viewed from a direction of arrows when cut at a vertical plane. FIG. 5 is an enlarged view of the position adjuster 37 at the trailing edge Le viewed from a side of the photoconductive drum 19 in FIG. 2. In FIG. 5, the base frame 35 is illustrated by dashed lines so that a structure of the position adjuster 37 can be understood more easily.

The position adjusting plate 38 includes a substantially rectangular plate shaped member. A semicircular guide portion 46 extends from an upper portion of the plate shaped member. Both sides of the position adjusting plate 38 are bent in the shape of a cross-section of the letter-L and function as reinforcement portions 45. A positioning hole 40 is arranged as a long and thin slit through a lower portion of the position adjusting plate 38. A protrusion 41 provided on the mounting bracket 33 is inserted into the positioning hole 40, and the position adjusting plate 38 is attached to the mounting bracket 33. A screw hole is arranged below the positioning hole 40. By inserting a screw 42 into the screw hole, the position adjusting plate 38 is fixed onto a side plate of the mounting bracket 33 arranged at a side of the photoconductive drum 19. An oblong guide hole 43 is provided in the guide portion 46 arranged on the upper portion of the position adjusting plate 38.

The cam member 39 includes a knob portion 39*a*, a cam portion 39*b*, an inserting portion 39*c*, and an operation portion 39*d*. The knob portion 39*a* is preferably substantially cylindrical. The substantially cylindrical cam portion 39*b* protrudes from a reverse side of the knob portion 39*a* and eccentrically from a center of the knob portion 39*a*. The substantially cylindrical inserting portion 39*c* protrudes from the cam portion 39*b*. A center of the inserting portion 39*c* is provided at the same position as the center of the knob portion 39*a*. The operation portion 39*d* is fixed on an edge of the knob portion 39*a* and disposed about a center of the knob portion 39*a*. A mounting hole 44 is arranged in a vertical portion of the base frame 35. The inserting portion 39*c* is inserted into the mounting hole 44 from the side of the exposing head 21. Accordingly, the cam member 39 is mounted rotatably within the mounting hole 44. In this case, the cam portion 39*b* fits loosely in the guide hole 43 of the position adjusting plate 38, and a semicircular outer circumference of the guide portion 46 makes contact with the operation portion 39*d*. Therefore, when the operation portion 39*d* is rotated along the outer circumference of the guide portion 46, the entire cam member 39 rotates. However, since the cam portion 39*b* is eccentrically arranged with respect to the knob portion 39*a* and the inserting portion 39*c*, a contact portion of the cam portion 39*b* and the guide hole 43 moves vertically accompanying the rotation of the cam member 39.

Figure 6:
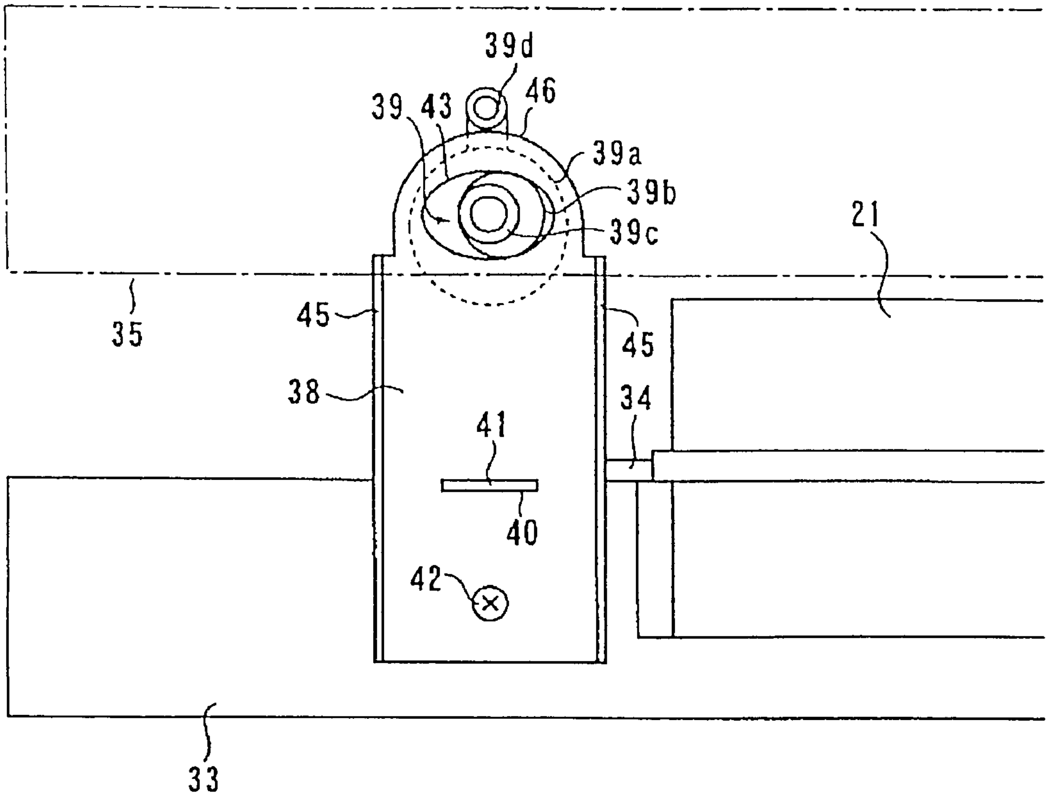
FIG. 6 is an enlarged view of the position adjuster viewed from the side of the photoconductive drum.
Figure 7:
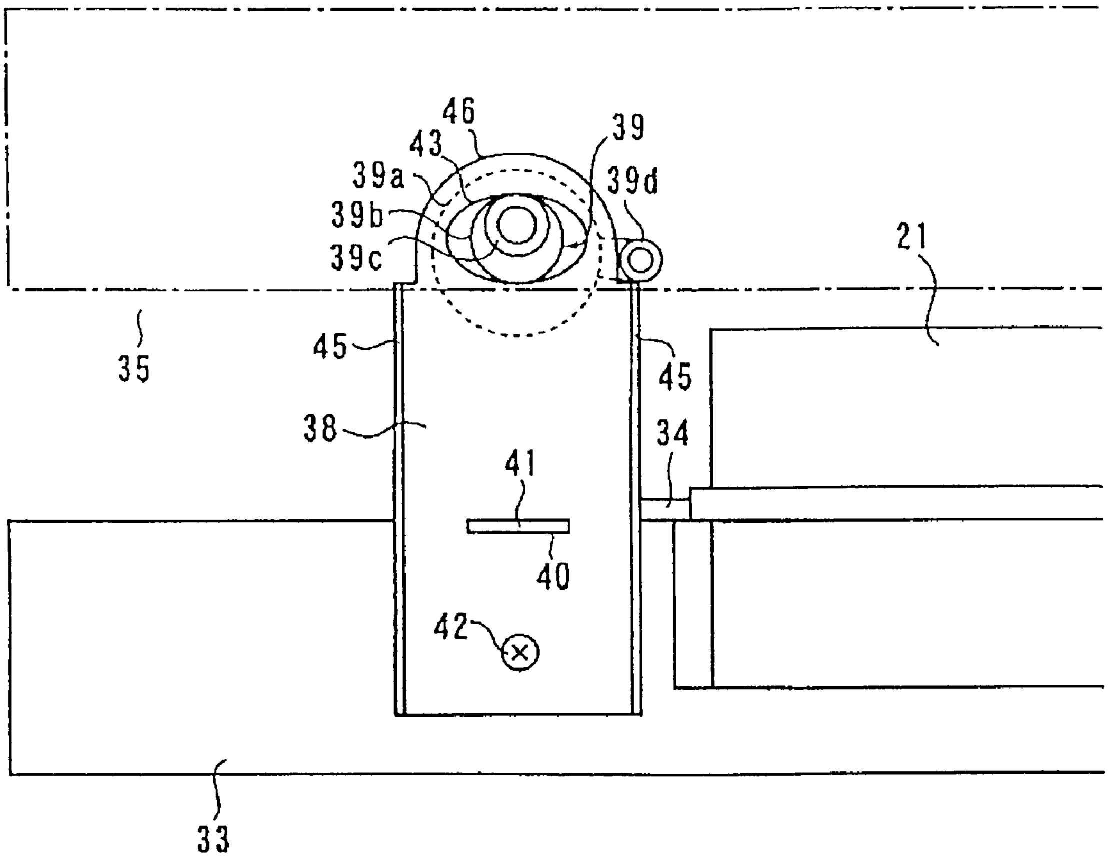
FIG. 7 is an enlarged view of the position adjuster viewed from the side of the photoconductive drum.
Figure 8:
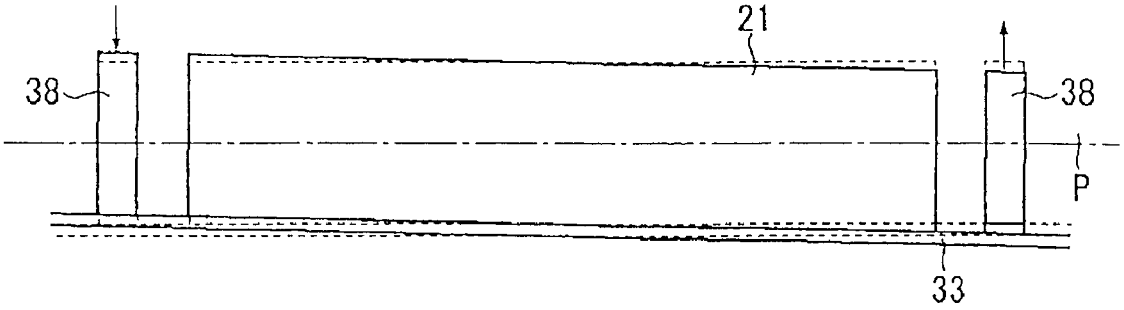
FIG. 8 illustrates an adjustment movement of the position adjusters.

In FIG. 5, the contact portion of the cam portion 39*b* and the guide hole 43 is at a highest position. By rotating the operation portion 39*d* clockwise, the position of the contact portion gradually descends as illustrated in FIG. 6. Then, as illustrated in FIG. 7, when the operation portion 39*d* is rotated clockwise to its limit, the position of the contact portion is at a lowest position. Therefore, by rotating the operation portion 39*d*, the position adjusting plate 38 continuously moves vertically, and the vertical position of the mounting bracket 33 on which the position adjusting plate 38 is fixed can be adjusted.

When adjusting the vertical position of the mounting bracket 33 by using the pair of the position adjusters 37, in a state in which the scanning line S is inclined as illustrated in FIG. 3, the scanning line can be easily adjusted to be parallel to the rotational center line according to the following procedure. For example, first, the operation portion 39*d* of the leading edge Ls is adjusted and the position adjusting plate 38 at the leading edge Ls is lowered. Then, the operation portion 39*d* of the trailing edge Le is adjusted and the position adjusting plate 38 at the trailing edge Le is elevated. As a result, the position adjusting plate 38 is provided in a state as illustrated with dotted lines in FIG. 8. Since the position adjusting plate 38 continuously moves vertically accompanying the rotation of the operation portion 39*d*, a fine adjustment can be carried out. In addition, each of the position adjusters is disposed at the leading edge and the trailing edge of the output field of the laser light, respectively. Therefore, compared with a case where only one adjuster is provided, by simultaneously adjusting both of the position adjusters, an adjustment operation can be carried out easily and reliably.

Figure 9:
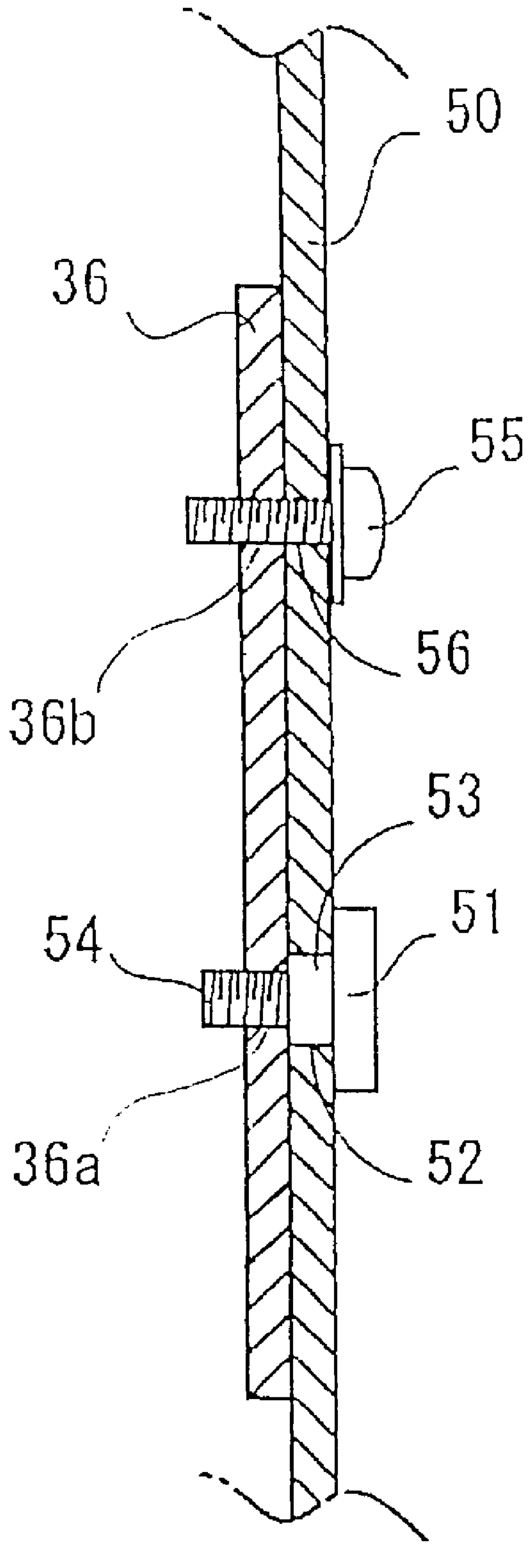
FIG. 9 is a cross-sectional view illustrating a fixed state at a fixing portion of a mounting bracket.

FIG. 9 is an enlarged cross-sectional view at a plane passing through the screw holes 36*a* and 36*b* in a state in which the fixing portion 36 of the mounting bracket 33 is fixed on a side frame 50. A holding screw 51 is inserted through a mounting hole 52 arranged through the side frame 50, and screwed in the screw hole 36*a*. A diameter of the mounting hole 52 is larger than a diameter of the screw hole 36*a*. A fitting portion 53 of the holding screw 51 fits in the mounting hole 52. A screw portion 54 extends from the fitting portion 53 is screwed in the screw hole 36*a*. Therefore, the fixing portion 36 is not fixed on the mounting hole 52, and is capable of rotating about the mounting hole 52.

Meanwhile, a fixing screw 55 is inserted through a mounting hole 56 arranged through the side frame 50, and screwed in the screw hole 36*b*. The fixing screw 55 is screwed together with both the mounting hole 56 and the screw hole 36*b*. The fixing portion 36 is, thus, fixed on the side frame 50.

The mounting bracket 33 is temporarily held on the side frame 50 by the holding screw 51 in a state in which the mounting bracket 33 can be pivoted. After adjusting the inclined position by the position adjusters 37, the mounting bracket 33 is fixed completely on the side frame 50 by the fixing screw 55. Accordingly, the position of the mounting bracket 33 can be maintained stably in an adjusted state.

Figure 10:
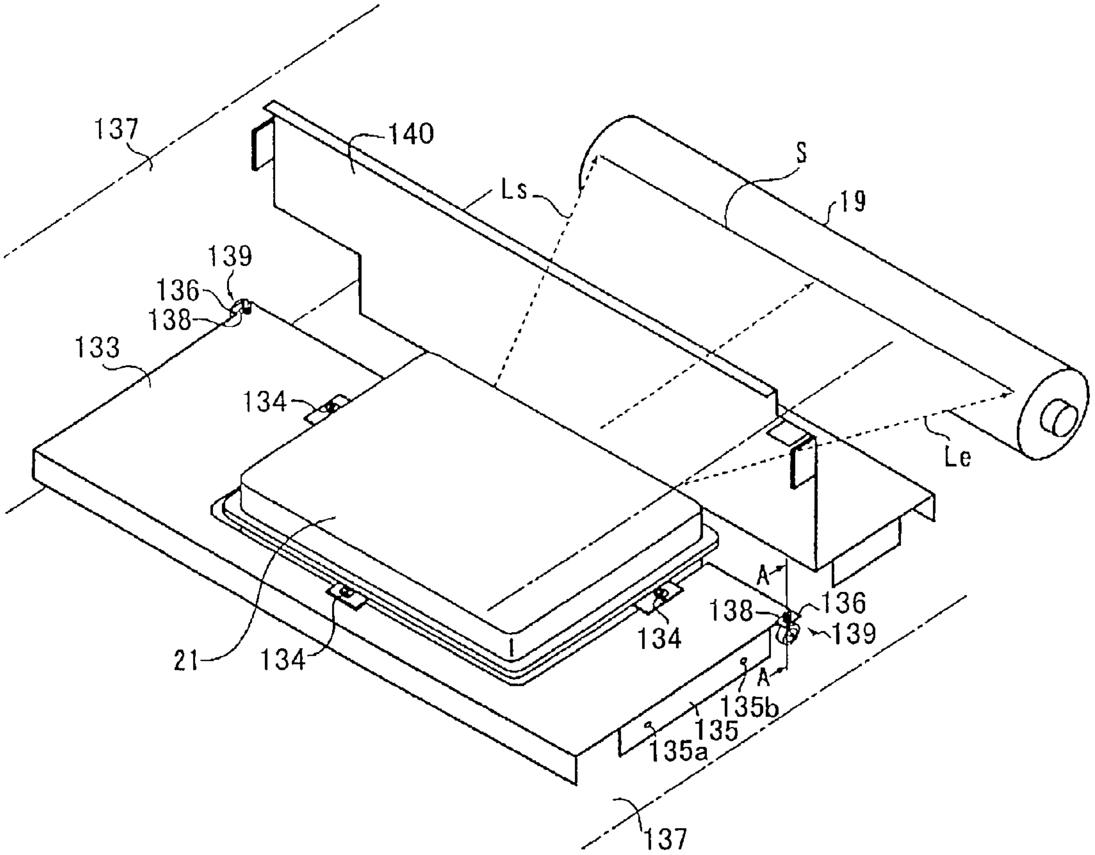
FIG. 10 is a perspective view relating to a portion where an exposing head is mounted according to another preferred embodiment of the present invention.

Next, with reference to FIG. 10 through FIG. 18, a description will be made of another unique feature of an image forming device according to a second preferred embodiment of the present invention. FIG. 10 is a perspective view illustrating a mounted portion of the exposing head 21 according to the second preferred embodiment of the present invention. To facilitate comprehension of the drawing, side frames 137 are omitted in FIG. 10 (an outline of the side frames 137 is indicated by dashed lines). Optical components, such as a laser light source, a polygon mirror and a plurality of lenses, are unitized and provided in the exposing head 21. The exposing head 21 is fixed at mounting holes of a mounting bracket 133. Three fixing portions 34 are arranged to protrude horizontally from a side surface of the exposing head 21. The fixing portions 134 are fixed by a screw, a pin, or other suitable fixing element at a periphery of the mounting holes of the mounting bracket 33.

A fixing portion 135 and a locking portion 136 are arranged on both sides of the mounting bracket 133, respectively. The fixing portion 135 is bent perpendicularly from both sides of the mounting bracket 133. The locking portion 136 protrudes horizontally from both sides of the mounting bracket 133. Two screw holes 135*a* and 135*b* are arranged on each of the fixing portions 135 at a prescribed interval between one another in a horizontal direction. One of the screw holes 135*a* is arranged at a position located away from the photoconductive drum 19. The other screw hole 135*b* is arranged at a position located closer to the photoconductive drum 19. The mounting bracket 133 is mounted onto the side frames 137 by a holding screw screwed into the screw hole 135*a*, to be described later, such that the mounting bracket 133 can be pivoted. The mounting bracket 133 is fixed onto the side frames 137 by a fixing screw screwed into the screw hole 135*b*.

The locking portions 136 preferably have a substantially flat rectangular shape, for example. The locking portions 136 can be fit into locking holes 138 arranged on the side frames 137 (illustrated with dashed lines) of a main body frame. The locking portions 136 can be moved vertically by being held by a pair of position adjusters 139 provided on the side frames 137. The locking holes 138 on the side frames 137 are arranged as elongated holes so that the locking portions 136 can move towards the photoconductive drum 19. Accordingly, an interval between the exposing head 21 and the photoconductive drum 19 can be adjusted.

When mounting the mounting bracket 133 onto the side frames 137, first, the locking portions 136 are fit into the locking holes 138 of the side frames 137, and the interval between the exposing head 21 and the photoconductive drum 19 is adjusted. Then, the holding screws are screwed into the screw holes 135*a*. Accordingly, the mounting bracket 133 is held temporarily onto the side frames 137. In this state, the mounting bracket 133 can be pivoted around the screw holes 135*a*. As to be described later, by vertically moving the locking portions 136 by the position adjusters 139, an inclined position of the exposing head 21 can be easily adjusted. Then, after the adjustment of the inclined position of the exposing head 21 by the position adjusters 139 has been completed, the mounting bracket 133 is fixed completely on the side frames 137 by screwing the fixing screws into the screw holes 135*b*.

A base frame 140, which is a part of the main body frame, is disposed above a side of the exposing head 21 located closer to the photoconductive drum 19. The base frame 140 is preferably a metal plate arranged in the shape of a cross-section of the letter-L. The base frame 140 is fixed between the side frames 137. A vertical portion of the base frame 140 is disposed substantially parallel to a side surface of the bracket 133 located closest to the photoconductive drum 19. A horizontal portion of the base frame 140 protrudes above an output field of the laser light from the exposing head 21 and towards the photoconductive drum 19.

Figure 11:
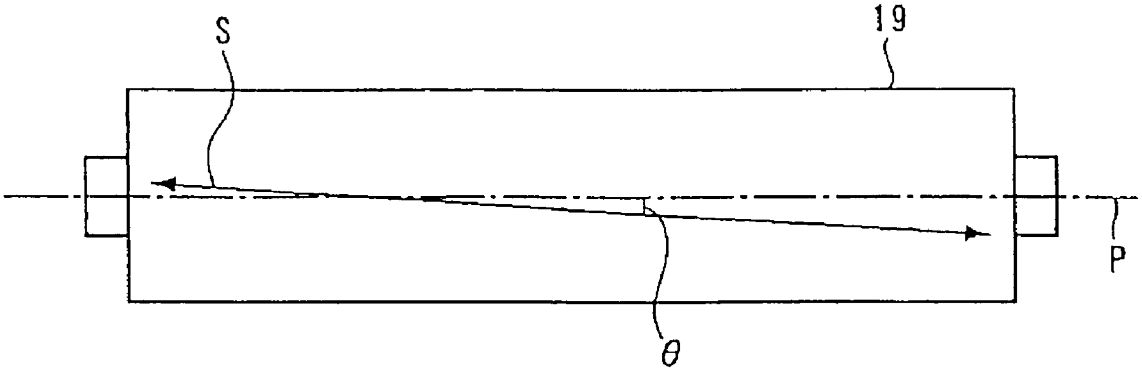
FIG. 11 illustrates a relationship between an axial line of a rotational shaft of a photoconductive drum and a scanning line.

A light path of the laser light output from the exposing head 21 sequentially moves within the output field from a leading edge Ls to a trailing edge Le. Accordingly, the laser light is irradiated along a scanning line S on the surface of the photoconductive drum 19. FIG. 11 illustrates a relationship between a rotational center line P of a rotational shaft of the photoconductive drum 19 and the scanning line S. To form an electrostatic latent image accurately on the surface of the photoconductive drum 19, the rotational center line P and the scanning line S are required to be parallel or to coincide with one another. As illustrated in FIG. 11, when the scanning line S is inclined at an angle θ with respect to the rotational center line P, an electrostatic latent image is also inclined on the surface of the photoconductive drum 19. To adjust such an inclination, each of the position adjusters 139 is provided respectively at the leading edge Ls and the trailing edge Le.

Figure 12:
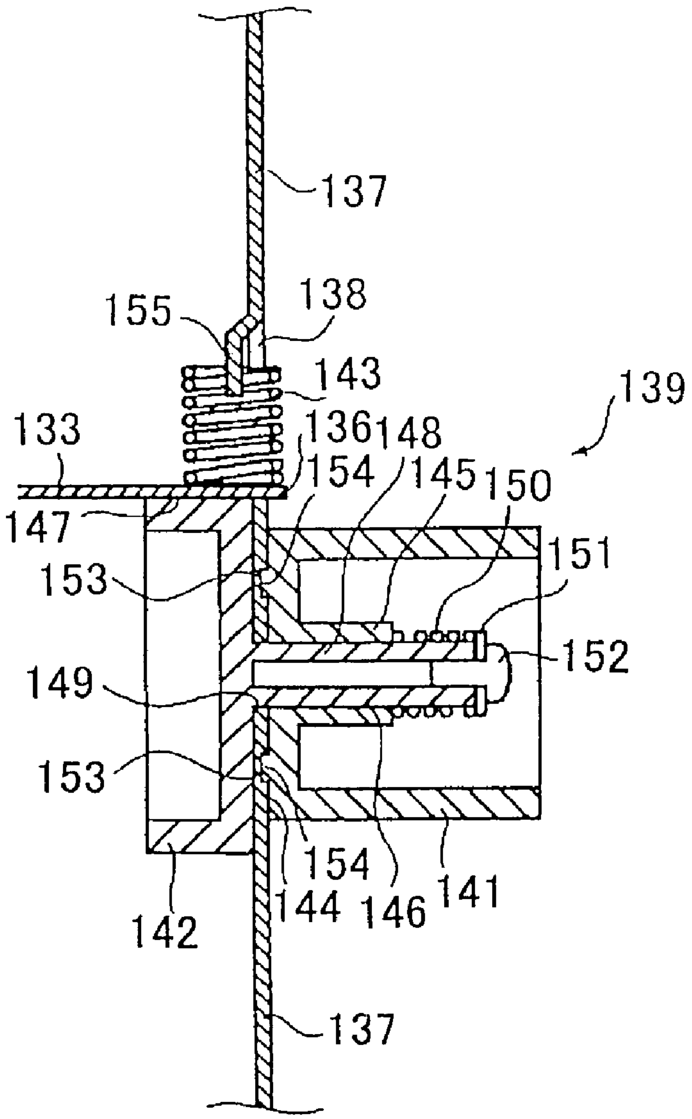
FIG. 12 is an enlarged cross-sectional view of a position adjuster taken along lines A-A in FIG. 10.
Figure 13:
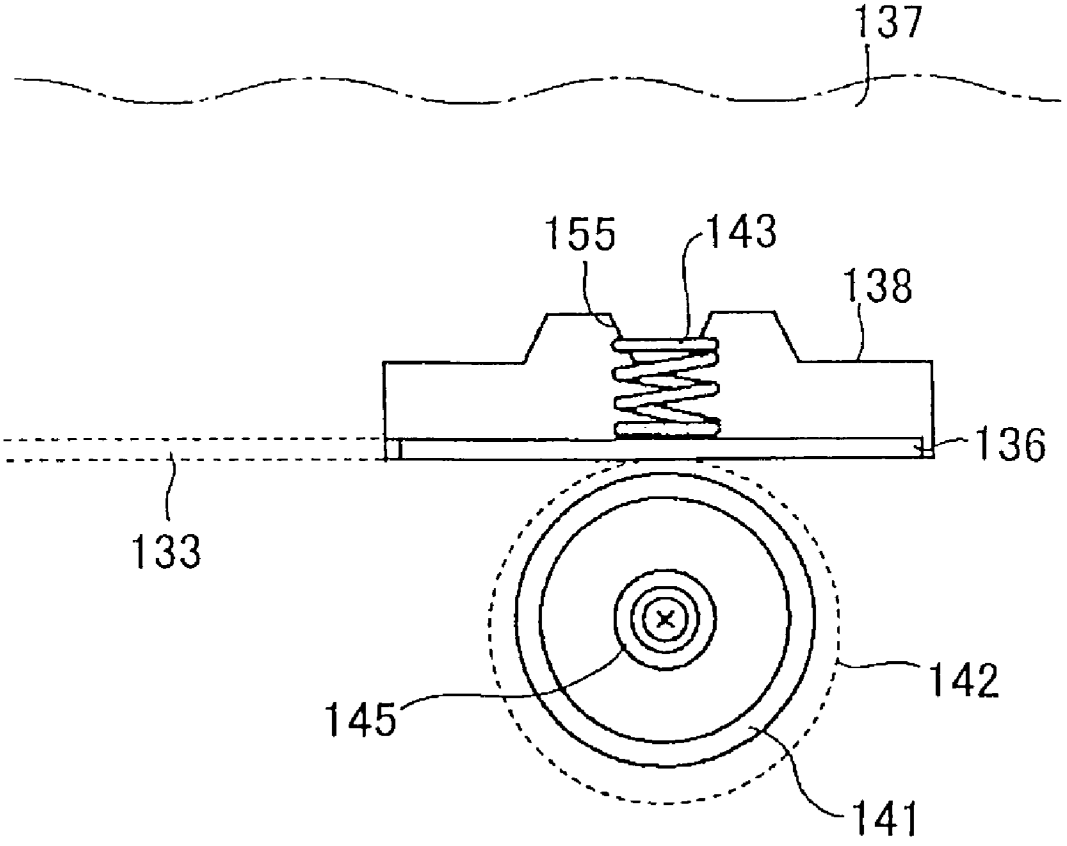
FIG. 13 illustrates the position adjuster viewed from a side frame.

FIG. 12 is a cross-sectional view taken along lines A-A of FIG. 10, and is across-sectional view of a portion of the position adjuster 139 at the trailing edge Le cut at a vertical plane. FIG. 13 is a view of the position adjuster 139 viewed from an outer side of the side frame 137. Further, since the position adjuster 139 at the leading edge Ls also has the same structure, a description thereof will be omitted.

The position adjuster 139 includes a knob member 141, a cam member 142 and an urging member 143. The substantially cylindrical knob member 141 has an end surface 144 as a bottom surface. The end surface 144 makes contact with the side frame 137. An opposite end surface of the end surface 144 is open. A shaft supporting portion 145 protrudes inwards from a center of the end surface 144. A shaft hole 146 is arranged in the shaft supporting portion 145. The shaft hole 146 penetrates from the end surface 144 and along the shaft supporting portion of the knob member 141.

The cam member 142 has a bar-shaped shaft portion 148. The shaft portion 148 protrudes from a bottom surface of the cam member 142 at a position that is spaced from a center of a cylindrical portion of the cam member 142. A cam surface 147 is arranged on an outer circumference of the cylindrical portion. The center of the shaft portion 148 is parallel or substantially parallel to the center of the cylindrical portion. The shaft portion 148 is inserted into a mounting hole 149 arranged in the side frame 137, and into the shaft hole 146 of the knob member 141. An inner diameter of the mounting hole 149 is approximately the same size as an outer diameter of the shaft portion 148 to prevent jouncing. The shaft portion 148 preferably has a substantially D-shaped cross section and an inner surface of the shaft hole 146 also has a substantially D-shaped cross section. Therefore, in a state in which the shaft portion 148 is inserted in the shaft hole 146, the knob member 141 and the cam member 142 are integrally rotatable.

Figure 14:
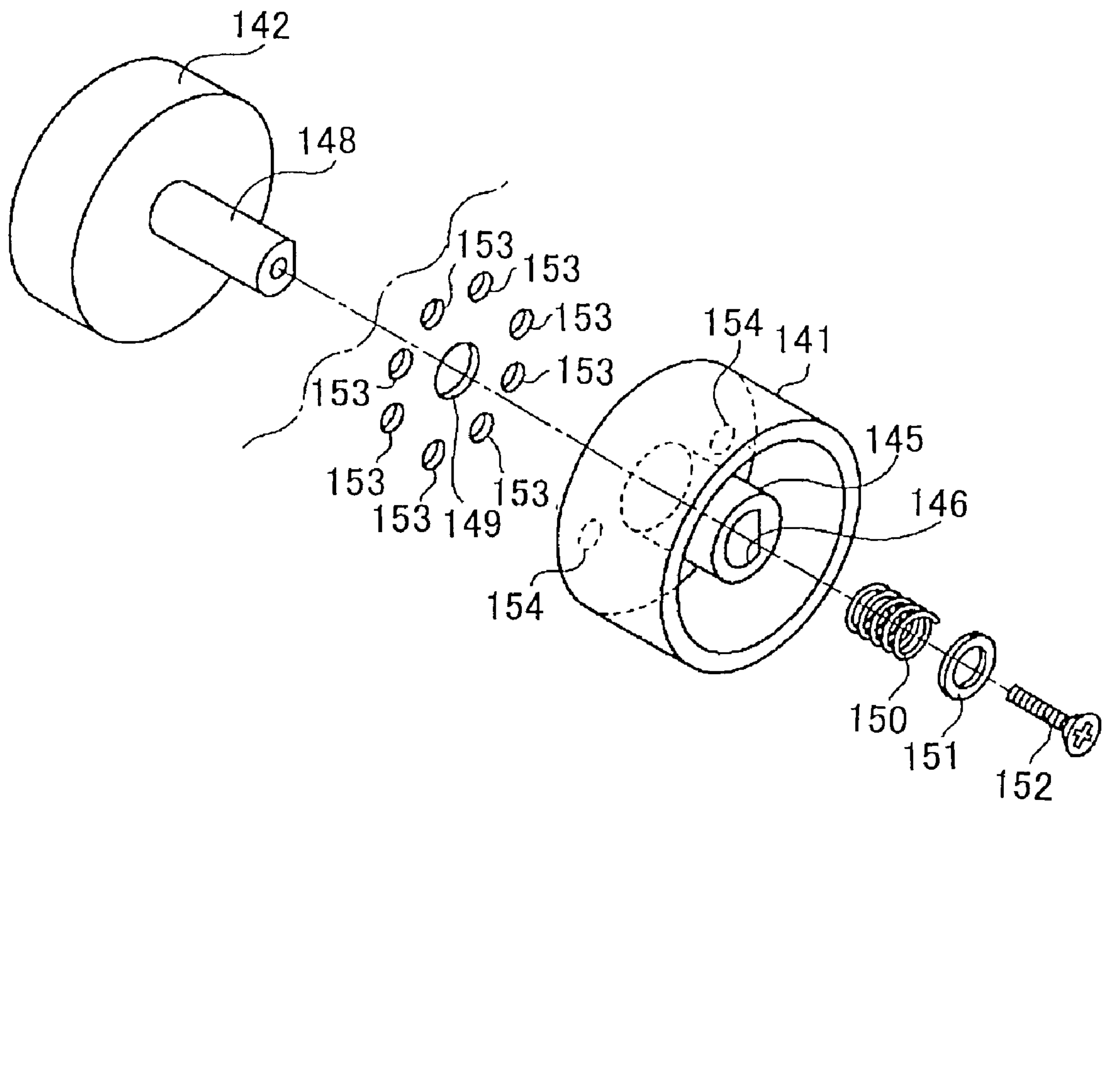
FIG. 14 is an exploded perspective view of a knob member and a cam member.

When the shaft portion 148 is inserted into the shaft hole 146, a tip end portion of the shaft portion 148 protrudes from the shaft supporting portion 145. A coil spring 150 and a washer 151 are provided on the protruding portion and attached immovably by a screw 152. FIG. 14 is an exploded perspective view of the knob member 141 and the cam member 142. A tip end of the screwed shaft portion 148 is urged against a tip end of the shaft supporting portion 145 via the coil spring 150. Therefore, the knob member 141 and the cam member 142 are biased to the side frame 137, and a bottom surface of the knob member 141 and a bottom surface of the cam member 142 make contact with the side frame 137. As illustrated in FIG. 14, a plurality of positioning holes 153 are arranged on the surface of the side frame 137 facing the knob member 141 with a prescribed angle displaced between each of the positioning holes 153. A pair of positioning protrusions 154 protrudes from the bottom surface of the knob member 141. The positioning protrusions 154 fit into the positioning holes 153, and the knob member 141 is thus positioned.

Figure 15:
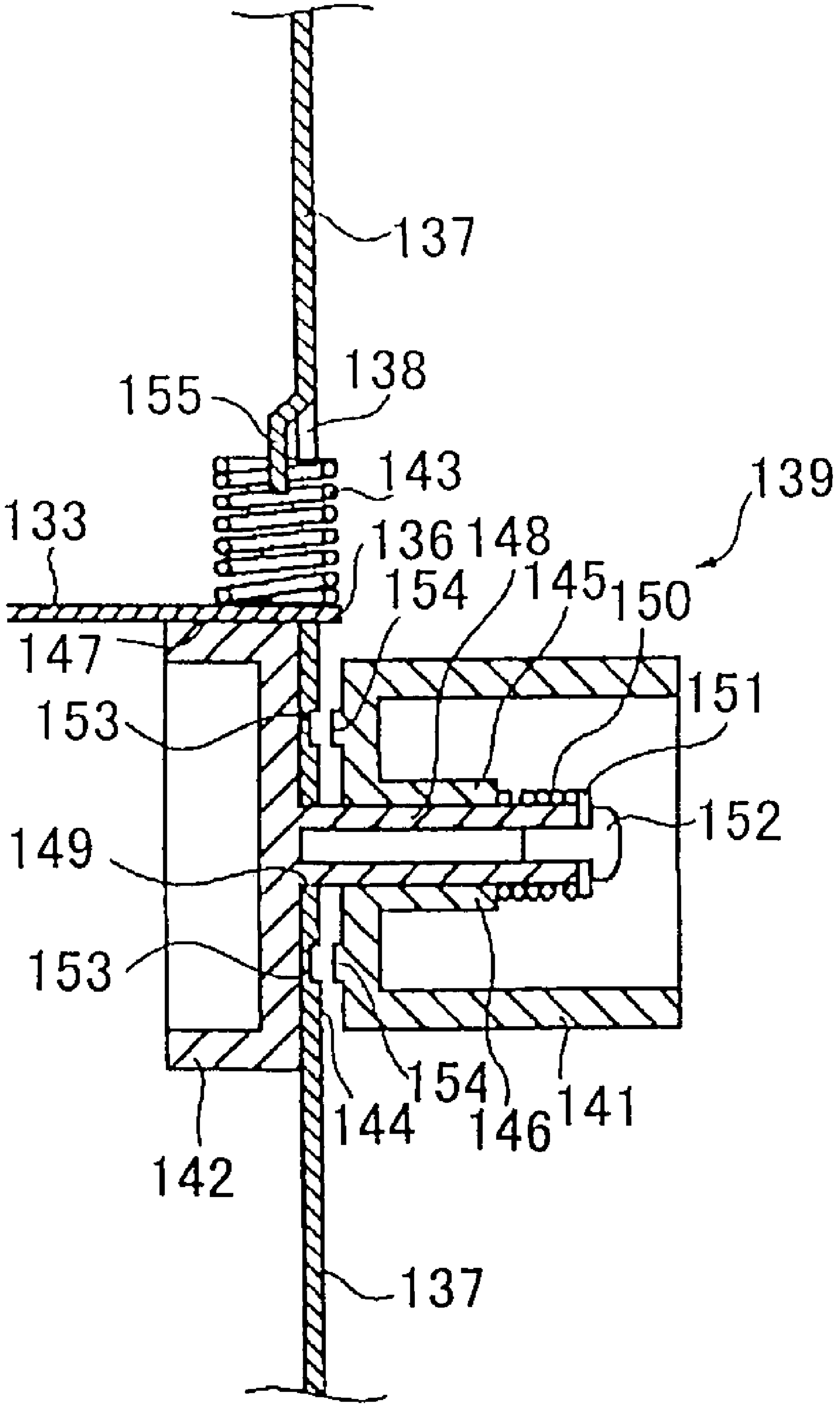
FIG. 15 is a cross-sectional view illustrating a state when rotating the knob member in FIG. 12.

When rotating the knob member 141 and changing a position of the knob member 141, as illustrated in FIG. 15, the knob member 141 is pulled in a direction to be separated from the side frame 137 against the urging force of the coil spring 150, and the positioning protrusions 154 are separated from the positioning holes 153. Then, in a state in which the positioning protrusions 154 and the positioning holes 153 are separated from one another, by rotating the knob member 141 for a prescribed angle, the knob member 141 can be returned to an original state.

A bottom surface of the locking portion 136 of the mounting bracket 133 is placed on an upper portion of the cam surface 147 of the cam member 142. The urging member 143 having a coil spring is urged against an upper surface of the locking portion 136. The upper portion of the urging member 143 is fit in a locking protrusion 155 arranged on an upper portion of the locking hole 138 of the side frame 137. A lower portion of the urging member 143 is urged against the upper surface of the locking portion 136 at all times. Therefore, the locking portion 136 is sandwiched between the cam surface 147 of the cam member 142 and the urging member 143 at all times.

Figure 16:
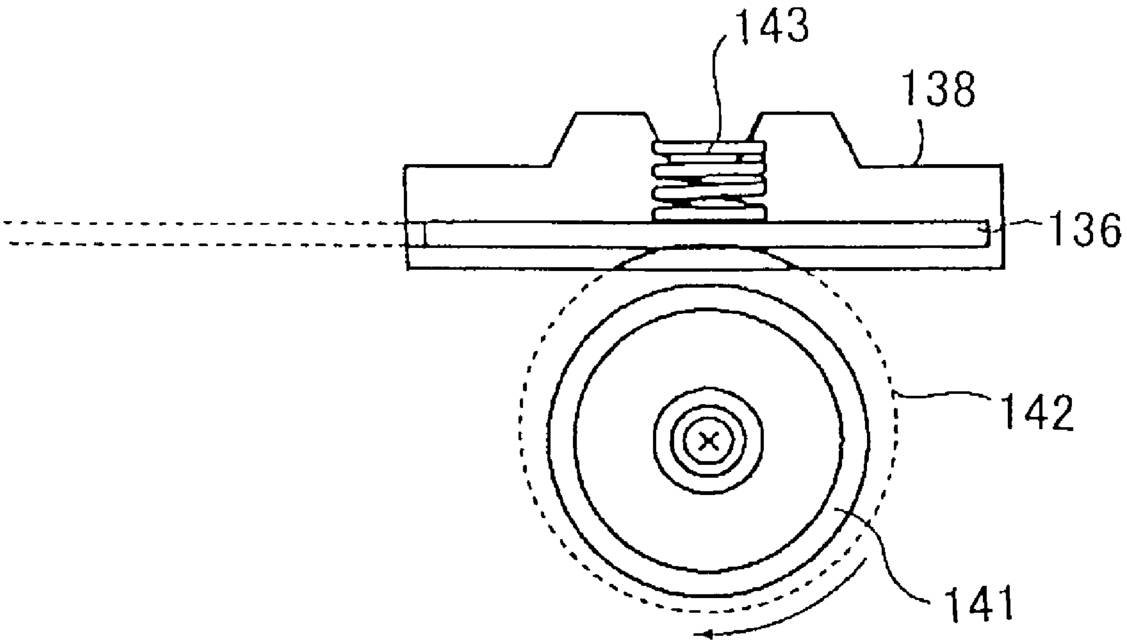
FIG. 16 illustrates a state in which the knob member is rotated in FIG. 13.
Figure 17:
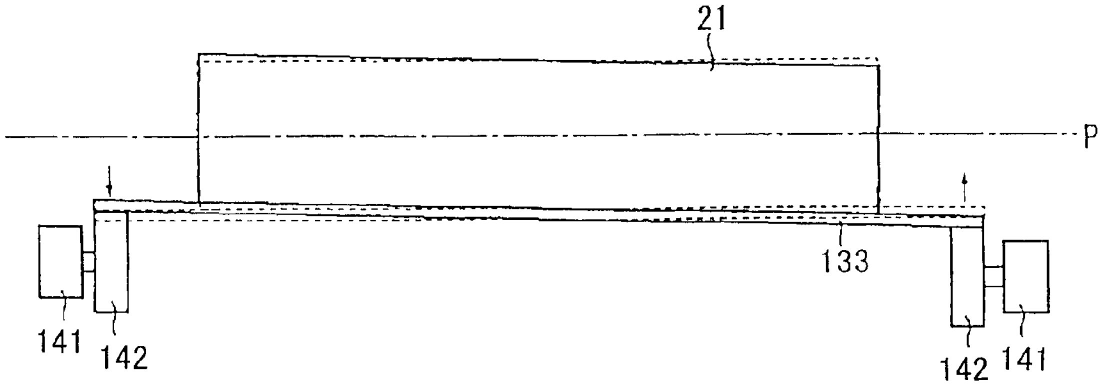
FIG. 17 illustrates an adjustment movement of the position adjusters.

FIG. 16 illustrates a state in which the knob member 141 is rotated by a prescribed angle from the state illustrated in FIG. 13. Accompanying the rotation of the knob member 141, the cam member 142 also rotates integrally. However, since the shaft portion 148 is arranged eccentrically with respect to the substantially cylindrical portion of the cam member 142, a portion of the cam surface 147 making contact with the locking portion 136 moves vertically. In FIG. 13, the locking portion 136 of the mounting bracket 133 makes contact with a bottom portion of the locking hole 138 of the side frame 137. However, in FIG. 16, the locking portion 136 is pushed upward by the cam member 142 against the urging force of the urging member 143. Thus, the position adjustment of the locking portion 136 is carried out by rotating the knob member 141 as described above.

The locking portion 136 is sandwiched between the cam surface 147 of the cam member 142 and the urging member 143 at all times. Therefore, the locking portion 136 is reliably maintained in a desired position and is stable throughout operation. The positioning protrusions 154 of the knob member 141 fit into the positioning holes 153 of the side frames 137 and are maintained at a prescribed position. When adjusting the vertical position of the mounting bracket 133 by using the pair of the position adjusters 139, for example, in a state in which the scanning line S is inclined as illustrated in FIG. 11, the scanning line can be easily adjusted to be parallel to the rotational center line according to the following procedure. For example, first, the knob member 141 of the leading edge Ls is adjusted and the cam member 142 of the leading edge Ls is lowered. Then, the knob member 141 of the trailing edge Le is adjusted and the cam member 142 of the trailing edge Le is elevated. As a result, the cam member 142 is provided in a state as illustrated with dotted lines in FIG. 17. Moreover, each of the position adjusters 139 is disposed at the leading edge and the trailing edge of the output field of the laser light, respectively. Therefore, compared with a case where only one adjuster is provided, by simultaneously adjusting both of the position adjusters, the adjustment operation can be carried out easily and reliably.

Figure 18:
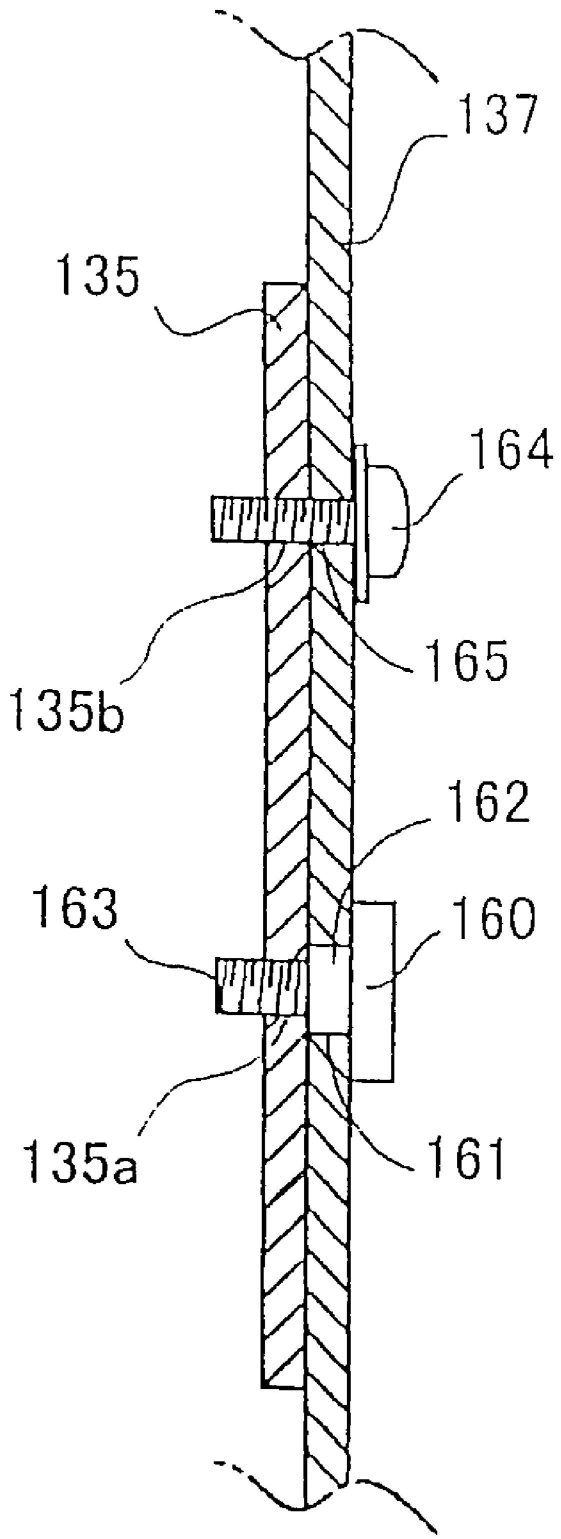
FIG. 18 is a cross-sectional view illustrating a fixed state at a fixing portion of a mounting bracket.

FIG. 18 is an enlarged cross-sectional view at a plane passing through both the screw holes 135*a* and 135*b* in a state in which the fixing portion 135 of the mounting bracket 133 is fixed on the side frame 137. A holding screw 160 is inserted through a mounting hole 161 arranged through the side frame 137, and screwed into the screw hole 135*a*. A diameter of the mounting hole 161 is larger than a diameter of the screw hole 135*a*. A fitting portion 162 of the holding screw 160 fits in the mounting hole 161. A screw portion 163 fixed on the fitting portion 162 is screwed in the screw hole 135*a*. Therefore, the fixing portion 135 is not fixed on the mounting hole 161, and is capable of rotating.

Meanwhile, a fixing screw 164 is inserted through the mounting hole 165 arranged through the side frame 137, and screwed in the screw hole 135*b*. The fixing screw 164 is screwed together with both the mounting hole 165 and the screw hole 135*b*. The fixing portion 135 is thus fixed on the side frame 137.

The mounting bracket 133 is temporarily held on the side frame 137 by the holding screw 160 in a state in which the mounting bracket 133 can be pivoted. Then, as described above, after adjusting the inclined position by the position adjusters 139, the mounting bracket 133 is fixed completely on the side frame 137 by the fixing screw 164. Accordingly, the position of the mounting bracket 133 can be reliably maintained in an adjusted state.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

What is claimed is:

1. An image forming device, comprising:
- an image carrier;
- a charging device, which charges a surface of the image carrier;
- an exposing device, which scans a laser light on the charged surface of the image carrier and forms an electrostatic latent image;
- a developing device, which adheres toner onto the electrostatic latent image formed on the surface of the image carrier and visualizes the electrostatic latent image;
- a control device, which controls a rotation of the image carrier and controls each of the charging device, the exposing device and the developing device to form an image onto paper; and
- position adjusting devices, each of the position adjusting devices respectively provided at a leading edge and a trailing edge of an output field of the laser light of the exposing device, and the position adjusting devices move the exposing device in a direction that intersects with a plane that includes a rotational center line of the image carrier so as to adjust a scanning direction of the laser light to be parallel to the rotational center line of the image carrier.

2. The image forming device according to claim 1, further comprising a main body frame, wherein each of the position adjusting devices includes a cam member mounted rotatably on the main body frame and a position adjusting member including a guide hole, the cam member is disposed within the guide hole, and the position adjusting member and the exposing device move in response to a rotation of the cam member.

3. The image forming device according to claim 2, further comprising a mounting bracket supporting the exposing device, the mounting bracket having a locking portion protruding horizontally, and a locking hole extending through the main body frame, wherein the locking portion is positioned in the locking hole such that the locking portion is vertically movable within the locking hole.

4. The image forming device according to claim 2, wherein the cam member includes a knob portion, a cam portion arranged eccentrically relative to a center of the knob portion and protruding from the knob portion, an inserting portion arranged concentrically with respect to the center of the knob portion and protruding from the cam portion, and an operation portion fixed on an edge of the knob portion.

5. The image forming device according to claim 4, wherein the knob portion, the cam portion and the inserting portion are substantially cylindrical.

6. The image forming device according to claim 4, wherein the position adjusting member is a plate shaped member, a semicircular guide portion is arranged on an upper portion of the plate shaped member, the guide hole is oblong and arranged in the guide portion, the cam portion is located within the guide hole, and the operation portion is arranged to slide against a semicircular outer circumference of the guide portion.

7. The image forming device according to claim 4, further comprising a mounting hole arranged in the main body frame, wherein the cam member is mounted rotatably on the main body frame by the inserting portion being located within the mounting hole.

8. The image forming device according to claim 3, further comprising a screw arranged to fix the mounting bracket onto the main body frame.

9. An image forming device, comprising:

a main body frame;

an image carrier;

a charging device, which charges a surface of the image carrier;

an exposing device, which scans a laser light on the charged surface of the image carrier and forms an electrostatic latent image;

a developing device, which adheres toner onto the electrostatic latent image formed on the surface of the image carrier and visualizes the electrostatic latent image;

a control device, which controls a rotation of the image carrier and controls each of the charging device, the exposing device and the developing device to form an image onto paper;

a supporting body on which the exposing device is placed and fixed; and position adjusting devices, each of the position adjusting devices respectively provided on the main body frame at a leading edge and a trailing edge of an output field of the laser light of the exposing device, and each of the position adjusting devices includes an urging member and a cam member; wherein a portion of the supporting body is urged against a cam surface of the cam member by the urging member, and by rotating the cam member, the exposing device is moved in a direction that intersects with a plane that includes a rotational center line of the image carrier, and the supporting body is adjusted so that a scanning direction of the laser light becomes parallel to the rotational center line of the image carrier.

10. The image forming device according to claim 9, wherein the supporting body is pivotally mounted on the main body frame, and a position of the supporting body is pivotally adjusted by the position adjusting devices.

11. The image forming device according to claim 10, wherein the supporting body includes a locking portion protruding horizontally, a locking hole extending through the main body frame, and the locking portion is located within the locking hole such that the locking portion is vertically movable within the locking hole.

12. The image forming device according to claim 11, wherein the locking hole is an elongated hole to enable the locking portion to move towards the image carrier.

13. The image forming device according to claim 10, wherein each of the position adjusting devices further includes a knob member having an end surface in contact with the main body frame, a shaft hole arranged in the end surface along a center of the knob member, the cam member has a shaft portion extending through a mounting hole arranged in the main body frame and extending into the shaft hole of the knob member, and the knob member and the cam member are integrally rotatable in a state in which the shaft portion is located in the shaft hole.

14. The image forming device according to claim 13, further comprising a spring arranged to bias the knob member and the cam member towards and into contact with the main body frame.

15. The image forming device according to claim 13, wherein the cam member includes a substantially cylindrical portion having a bottom surface and a cam surface arranged on an outer circumference of the substantially cylindrical portion, wherein the shaft portion protrudes from the bottom surface at an eccentric position with respect to a center of the substantially cylindrical portion, and a center of the shaft portion and the center of the substantially cylindrical portion are parallel to one another.

16. The image forming device according to claim 14, further comprising a plurality of positioning holes provided at a prescribed angle displaced from one another on a surface of the main body frame facing the knob member and at least one positioning protrusion protruding from a bottom surface of the knob member, wherein the knob member is positioned by fitting the at least one positioning protrusion into at least one of the plurality of positioning holes.

17. The image forming device according to claim 10, further comprising a screw arranged to fix the supporting body onto the main body frame.

18. A method of adjusting an exposing position of an image forming device, comprising the steps of:

moving an exposing device in a direction intersecting with a plane including a rotational center line of an image carrier at each of a leading edge and a trailing edge of an output field of a laser light; and adjusting a scanning direction of the laser light so as to be parallel to the rotational center line of the image carrier.

19. The method of adjusting the exposing position of the image forming device according to claim 18, further comprising the step of adjusting both of the leading edge and the trailing edge of the output field of the laser light.

20. The method of adjusting the exposing position of the image forming device according to claim 19, further comprising the step of fixing the exposing position after adjusting the exposing position.

* * * * *